United States Patent Office 3,790,460
Patented Feb. 5, 1974

3,790,460
CARBON MONOXIDE COPOLYMERS
Lester Weintraub, Bronx, N.Y., assignor to Air Products and Chemicals, Inc., Allentown, Pa.
No Drawing. Continuation of application Ser. No. 826,078, May 13, 1969, which is a continuation of application Ser. No. 502,286, Oct. 22, 1965. This application July 13, 1970, Ser. No. 56,188
Int. Cl. C08f 1/18, 13/04
U.S. Cl. 204—159.23   3 Claims

ABSTRACT OF THE DISCLOSURE

A vinyl halide, such as vinyl fluoride and vinyl chloride, and carbon monoxide are copolymerized in the simultaneous presence of a free-radical-producing compound and ultra-violet light, most advantageously at a polymerization temperature of 50° to 75° C., to produce a copolymer having a carbon monoxide content of more than 3% by weight and an intrinsic viscosity of at least 1 dl./g.

CROSS REFERENCE TO RELATED APPLICATIONS

This application is a continuation of application Ser. No. 826,078, filed May 13, 1969, which in turn is a continuation of parent application Ser. No. 502,286, filed Oct. 22, 1965.

This invention relates to interpolymers of carbon monoxide with vinyl halides and to methods of producing the same.

It has heretofore been proposed to form interpolymers of carbon monoxide and vinyl chloride by means of peroxy compounds as catalysts, but under the conditions proposed the interpolymer obtained will have a relatively low intrinsic viscosity and will lack other desirable properties.

It is, accordingly, an object of this invention to provide a process for obtaining interpolymers of carbon monoxide and vinyl halides having improved characteristics.

It is a further object of the invention to provide novel carbon monoxide-vinyl halide interpolymers.

These and related objects are achieved by polymerizing a vinyl halide, such as vinyl chloride or vinyl fluoride, in the presence of carbon monoxide and in the presence of a free-radical producing compound.

Since vinyl halides, such as vinyl chloride and vinyl fluoride, are gaseous at normal ambient temperatures, the polymerization is suitably carried out in a pressure vessel, such as an autoclave, at a pressure of 1000 to 1600 p.s.i. The temperature of polymerization can vary from 50° to 75° C., but preferably temperatures of 50° to 60° C. are employed. The time of polymerization will also vary, but the reaction is ordinarily carried out until no further reaction occurs, as evidenced by pressure drop. This ordinarily requires 10 to 20 hrs., but shorter or longer times can be employed, e.g. 6 to 30 hrs. The polymerization time can be even of longer duration, but such additional time serves no useful purpose.

It is not necessary to use a solvent, but an inert solvent can be employed if desired. For this purpose, any inert solvent, which is liquid under the conditions of polymerization, is suitably used, but the aliphatic hydrocarbons such as propane, butane, and iso-octane are particularly suitable.

The free-radical producing compound which is most suitably used is an organic or inorganic peroxide, such as hydrogen peroxide, lauroyl peroxide, benzoyl peroxide, tertiary butyl peroxy pivalate, tertiary butyl peroxide, dichlorobenzoyl peroxide, potassium persulfate, and the like, or an azonitrile compound such as disclosed in Hunt U.S. Pat. 2,471,959, e.g. azo-bis-iso-butyronitrile, which is conventionally referred to in the art as "AZN."

The ratio of vinyl halide to carbon monoxide charged to the polymerization vessel can vary over a considerable range, and is varied by varying the pressure of the applied carbon monoxide, e.g. using pressures of 1000 to 1600, preferably 1300 to 1500 p.s.i.

The products of the process of this invention can be characterized as having intrinsic viscosity values of at least 0.2 dl./g. and may have intrinsic viscosity of 0.4 dl./g. and above. They are further characterized by a carbon monoxide content of more than 3%, and the carbon monoxide content may be 4% or more for the vinyl chloride copolymer. For the vinyl fluoride copolymer the carbon monoxide content can be as high as 30%.

In accordance with a preferred form of the invention, the polymerization of vinyl chloride and carbon monoxide is carried out not only in the presence of the free-radical catalyst, but also in the presence of ultra-violet light. The ultra-violet light radiation can be provided from any convenient source, such as a mercury lamp, as is well-known in the art. The use of the ultra-violet radiation results in vinyl chloride-carbon monoxide copolymers having significantly higher intrinsic viscosities than the copolymers produced in the absence of the ultra-violet light. For example, copolymers with intrinsic viscosities above 1 can be readily prepared by polymerization in the presence of ultra-violet light, whereas the copolymers produced by the free-radical polymerization without ultra-violet light radiation generally have intrinsic viscosities of at most about 0.5.

The features and characteristics of the invention will be more readily apparent from the following detailed examples which are given, however, for illustrative purposes only and are not intended to be limitative of the invention. In the examples, all parts are by weight unless otherwise indicated.

EXAMPLE 1

Into an autoclave containing 140 parts of iso-octane and 15 parts of tetrahydrofuran there were introduced 90 parts of vinyl chloride and 0.5 parts of dichlorobenzoyl peroxide as catalyst. Carbon monoxide was then introduced in sufficient amount to provide a pressure of 1500 p.s.i. The reaction mixture was then maintained at 55° C. for 24 hrs. Thereupon, the vinyl chloride-carbon monoxide copolymer was recovered by filtration, washed with methanol and dried in a vacuum oven at 50° C. for 24 hrs. The copolymer thus recovered was a white solid and was obtained in a yield of about 20%. The copolymer contained about 5% carbon monoxide, had an intrinsic viscosity of about 0.40 dl./g. and a glass transition temperature ($T_g$) of 70° C.

EXAMPLE 2

Into an autoclave containing 140 parts of iso-octane there were introduced 90 parts of vinyl chloride and 0.5 parts of azo-bis-iso-butyronitrile as catalyst. Carbon monoxide was then introduced in sufficient amount to provide a pressure of 1500 p.s.i. The reaction mixture was then maintained at 65° C. for 24 hrs. Thereupon the vinyl chloride-carbon monoxide copolymer was recovered by filtration, washed with methanol and dried in a vacuum oven at 50° C. for 24 hrs. The copolymer thus recovered was a white solid and was obtained in a yield of about 20%. The copolymer contained about 5% carbon monoxide, had an intrinsic viscosity of about 0.25 dl./g. and a glass transition temperature ($T_g$) of 65° C.

EXAMPLE 3

Into a 100 ml. pressure buret (½″ glass window) there were introduced 36 parts of vinyl chloride and 0.5 parts of azo-bis-iso-butyronitrile as catalyst. Carbon monoxide was then introduced in sufficient amount to provide a pressure of 800 p.s.i. The reaction mixture, illuminated by the rays from a 100 watt ultra-violet lamp, was then maintained at ambient temperature (25° C.) for 10 hrs. Thereupon the vinyl chloride-carbon monoxide copolymer was recovered by filtration, washed with methanol and dried in a vacuum oven at 50° C. for 24 hrs. The copolymer thus recovered was a white solid and was obtained in a yield of about 30%. The copolymer contained about 4% carbon monoxide and had an intrinsic viscosity of about 1.2 dl./g. It also had a glass transition temperature ($T_g$) of 82° C. as determined by differential thermal analysis, and a thermal decomposition temperature above 200° C.

EXAMPLE 4

Into an autoclave containing 140 parts of iso-octane there were introduced 80 parts of vinyl fluoride and 0.5 parts of azo-bis-iso-butyronitrile as catalyst. Carbon monoxide was then introduced in sufficient amount to provide a pressure of 1400 p.s.i. The reaction mixture was then maintained at 75° C. for 20 hrs. Thereupon the vinyl fluoride-carbon monoxide copolymer was recovered by filtration, washed with methanol and dried in a vacuum oven at 50° C. for 24 hrs. The copolymer thus recovered was a tan solid, which was insoluble in acetone and tetrahydrofuran, and was obtained in a yield of about 4%. The copolymer contained a vinyl fluoride to carbon monoxide ratio of about 1.5:1, and had a glass transition temperature ($T_g$) of 47° C.

Intrinsic viscosity values in dl./g., as used herein, are determined in conventional manner by extrapolation to infinite dilution of the reduced viscosity values at several concentrations of the polymer in cyclohexanone, as determined, for example, according to ASTM D1243-60, Method A, but at 25° C. The vinyl halide content of the copolymer is determined by elemental analyses. The glass transition temperature ($T_g$) is also determined in conventional manner.

The products of this invention can be molded and extruded to provide shaped forms. They can also be cross-linked, e.g. with a diamine such as ethylene diamine, to make them more thermally stable.

It will be apparent to those skilled in the art that various changes and modifications may be made in the embodiments described above without departing from the invention, as defined in the appended claims. It is intended, therefore, that all matter contained in the foregoing description shall be interpreted as illustrative only and not as limitative of the invention.

I claim:

1. A process for making carbon monoxide interpolymers having a carbon monoxide content of more than 3% by weight and an intrinsic viscosity of at least 1 dl./g., which process comprises polymerizing carbon monoxide with vinyl chloride or vinyl fluoride at a pressure from about 800 p.s.i. to about 1600 p.s.i. and at a temperature of about 25° C. to about 75° C., the polymerization being further conducted simultaneously in the presence of a free-radical-producing compound and ultraviolet light.

2. A process as defined in claim 1, wherein the polymerization is carried out in the presence of a liquid aliphatic hydrocarbon containing up to 8 carbon atoms.

3. A process as defined in claim 2, wherein the temperature of polymerization is 50 to 75° C.

References Cited

UNITED STATES PATENTS

| | | | |
|---|---|---|---|
| 2,495,286 | 1/1950 | Brubaker, | 260—87.5 |
| 2,471,959 | 5/1949 | Hunt | 260—87.5 |

OTHER REFERENCES

Billmeyer, F. W., Textbook of Polymer Chemistry, New York, Interscience Publishers, Inc., 1957, p. 207, QD28/P6B5.

JOSEPH L. SCHOFER, Primary Examiner

J. A. DONAHUE, Jr., Assistant Examiner

U.S. Cl. X.R.

204—159.24; 260—63, 87.5 A, 87.5 R